March 28, 1967 J. A. RODAER 3,311,807

STATIC INVERTER

Filed Sept. 13, 1963

INVENTOR.
James A. Rodaer

BY Robert E. Fowler

ATTORNEY 3,311,807
STATIC INVERTER
James A. Rodaer, Kokomo, Ind., assignor to General Motors Corporation, Detroit, Mich., a corporation of Delaware
Filed Sept. 13, 1963, Ser. No. 308,808
7 Claims. (Cl. 321—18)

This invention relates to inverters to change D.C. to A.C. electric power of a different voltage and particularly to inverters which use no movable parts and are ordinarily known as static inverters.

With the advent of semiconductor devices static inverters have become more popular since they can be fabricated in smaller, more compact and easily portable units. One of the uses to which such an inverter can be put is in aircraft where only low voltage D.C. power is available, for example, 28 volts D.C. Many devices used in aircraft require higher voltage A.C. for operation such, for example as 115 volt, 400 cycle current.

It is an object in making the present invention to provide a static inverter of simple design and operation which utilizes feedback in the inter-stage coupling transformers to reduce transistor drive requirements.

It is a further object in making this invention to provide a static inverter having direct novel inter-stage coupling circuitry requiring a minimum of components.

It is a further object in making this invention to provide a static inverter in which protection is provided against overload or short circuits.

With these and other objects in view which will become apparent as the specification proceeds, my invention will be best understood by reference to the following specification and claims and the illustrations in the accompanying drawings, in which:

Figure 1:
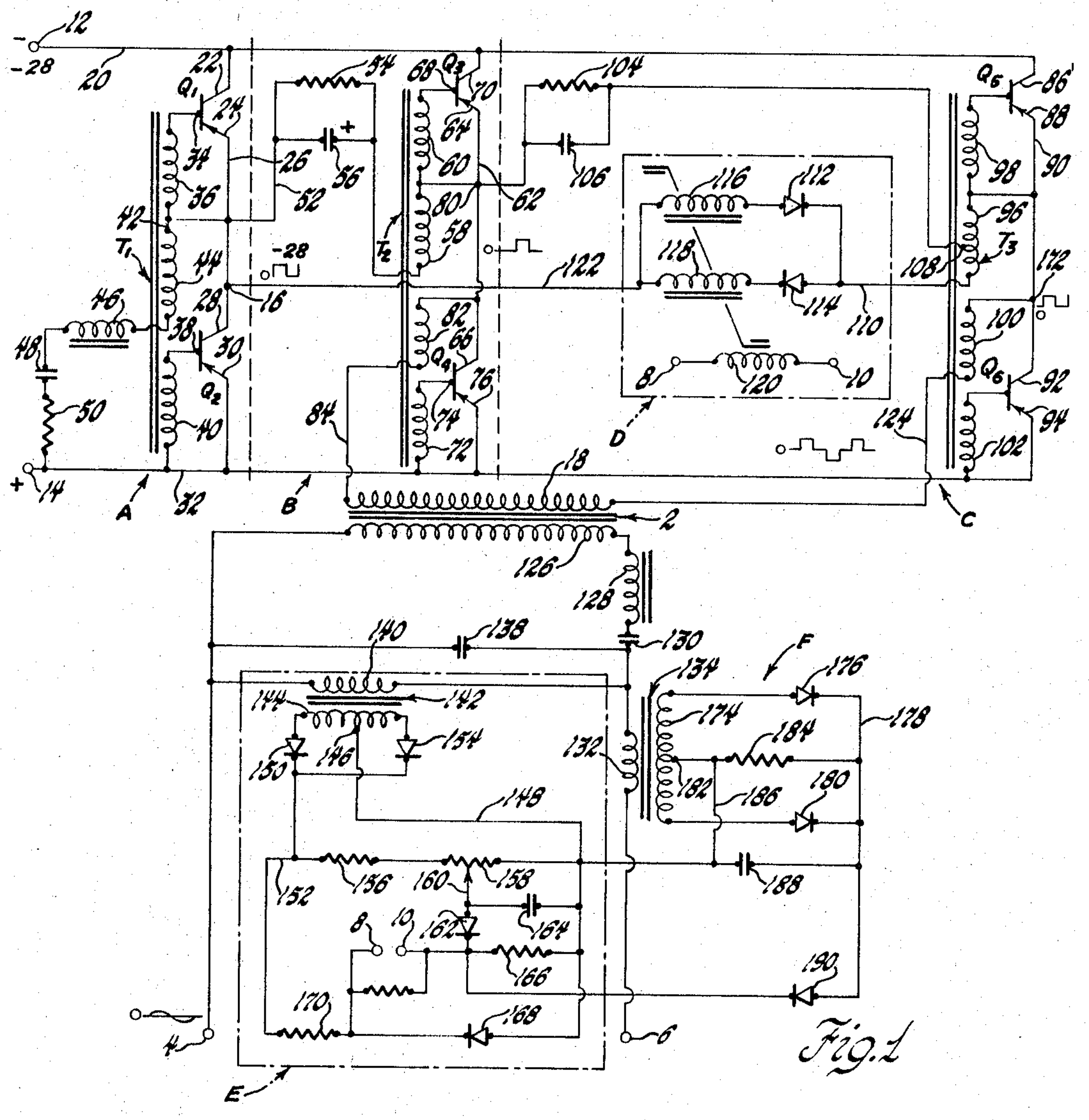
FIGURE 1 is a circuit diagram of a static inverter embodying my invention.

Referring now to FIG. 1, the inverter shown consists of several basic sections. First, a section A which is an oscillator for developing high frequency pulses: second, section B which is a portion of the power amplifier and together with section C forms a bridge power amplifier. Between these two sections there is a section D which is a pulse width controller and is used to vary the width of the pulses being amplified and thus regulate the output of the inverter from a signal developed in the output section. The output of the bridge power amplifier B–D is developed across transformer 2 and taken off across output terminals 4 and 6. Connected into the output circuit there is a section E known as an error detector in which a corrective signal is developed across contacts 8 and 10 and this signal is applied to these contacts in the pulse width controller in section D. Also included as an adjunct to the output circuit is a protective circuit portion section F which protects the total circuitry in the event of an overload or short circuit at the output circuit or load. In overall operation, a low voltage D.C. is applied to the input terminals 12 and 14 which provides the operating power for the oscillator and an oscillator square wave pulse is developed at point 16 as shown diagrammatically beside that number. This pulse is applied directly to the power amplifier section B and through the pulse width regulator D to the power amplifier section C, a phase inversion taking place between the output of section A and that of section B as shown by the step wave indicated at the output of section B and an adjusted phase inversion pulse appearing at the output of section C as illustrated. The output of the bridge power amplifier is then applied to the primary 18 of the transformer 2 to develop, for example, 115 volt A.C., 400 cycle wave across output terminals 4 and 6.

Referring now more specifically to the various portions or sections of the inventer, the oscillator section A is provided with power as before stated from the input terminals 12–14. Terminal 12 is connected through power line 20 to collector 22 of transistor $Q_1$. The emitter 24 of transistor $Q_1$ is connected through line 26 to the collector electrode 28 of transistor $Q_2$ whose emitter electrode 30 is directly connected to the opposite power line 32. The base electrode 34 of the transistor $Q_1$ is connected to one terminal of a first winding 36 on a transformer $T_1$ and base electrode 38 of transistor $Q_2$ is in like manner connected to one terminal of a second winding 40 of the same transformer. The remaining terminal of winding 36 is connected through conductor 42 to one terminal of a third winding 44 of the transformer $T_1$, the opposite terminal of which is connected to a series resonant tuned circuit including a choke coil 46, a condenser 48, which determines the frequency, and a resistor 50, said series circuit being connected to the opposite power line 32. Conductor 42 is also connected to line 26 extending between the emitter 24 of transistor $Q_1$ and collector 28 of transistor $Q_2$. The remaining terminal of winding 40 is connected to the power line 32.

This section of the static inverter is provided to generate a series of step pulses when energized by a D.C. voltage. The pulses will appear at point 16 and will vary in voltage from 0 to −28 volts upon an application of −28 volts D.C. to the input. The transistors $Q_1$ and $Q_2$ are alternately switched on and off and through the tank circuit which consists of inductance 46 and capacitor 48. This causes current to flow through the circuit consisting of power line 32, resistance 50, condenser 48, inductance 46, winding 44 of transformer $T_1$ and then in an alternate manner through either transistor $Q_1$ or $Q_2$ depending upon which transistor is conductive for that portion of the cycle. It is the presence of current in coil 44 of the transformer $T_1$ that causes a greater current to flow alternately in winding 36 or 40. The magnitude of these currents through the emitter-base circuits of the transistors is sufficient to cause them to be alternately switched into the saturated state in a very short period of time from the time current flowing through winding 44 passes through zero. The phase of the wave form generated at point 16 reinforces the resonant condition of inductance 46 and the condenser 48.

The output of the oscillator is applied simultaneously to the two legs of the bridge power amplifier B–C formed by transistors $Q_3$–$Q_4$ and $Q_5$–$Q_6$. Line 26 is connected through conductor 52 which forms one input line to a resistor 54 having a capacitor 56 in shunt therewith on to one terminal of a first winding 58 on transformer $T_2$. The remaining terminal of winding 58 is connected to one terminal of a second winding 60 of the transformer $T_2$, and to a conductor 62 extending between the emitter 64 of a transistor $Q_3$ and collector 66 of transistor $Q_4$. The remaining terminal of the second winding 60 is connected directly to the base electrode 68 of transistor $Q_3$. The collector electrode 70 of transistor $Q_3$ is connected to the power line 20 for proper bias voltage. A third winding 72 on the transformer $T_2$ has one terminal directly connected to the base 74 of transistor $Q_4$ and the other terminal connected to the opposite power line 32. The output of the oscillator is, therefore, applied to this half of the power amplifier through the coupling circuit including resistor 54 and capacitor 56.

Assuming that the system is operating and that a pulse has been applied, when current flows through the first winding 58 on the transformer $T_2$ it causes a larger current to flow through winding 72 and, therefore, through the emitter-base circuit of transistor $Q_4$. This keeps transistor $Q_4$ conducting and in a saturated state. The capacitor 56 charges during this period with a positive voltage on the right, as indicated, to a value equal to I times the resistance of 54. This corresponds to a time interval for the cycle of 0 to $\pi$ or 180°. At time $\pi$ the first pulse from the oscillator has been completed and the voltage falls to 0. Capacitor 56 now discharges through coil 58 and transistor $Q_4$ which has been conducting. This changes the polarity of the current in winding 58 to turn off $Q_4$ and turn on $Q_3$. As the voltage at point 80 rises to the applied voltage, current will flow from point 16 through resistor 54 and winding 58 and through $Q_3$ to line 20 providing proper polarity drive to maintain the switching. Therefore, the pulse appearing at point 80 is 180° out of phase with that appearing at point 16 as diagrammatically shown.

There is yet a fourth winding 82 on transformer $T_2$. This is a loading coil which has one terminal connected to line 62 at point 80 and the other terminal connected through line 84 to one end of the primary winding 18 of the main output transformer 2. Output current, therefore, flows in this winding and causes an additional current flow through the emitter-base circuit of whichever transistor $Q_3$ or $Q_4$ happens to be on. The value of this additional base current from this feedback or load coil is equal to the product of the current flowing through the load circuit times the turn ratio between either winding 60 or 72 and winding 82. This turn ratio is selected so that it will be less than the lowest gain the transistor can assume to insure that the transistor will always operate in a saturated manner.

The other half of the bridge power amplifier is formed by section C and consists of the two transistors $Q_5$ and $Q_6$. The collector electrode 86 of the transistor $Q_5$ is directly connected to power line 20 and the emitter electrode 88 of transistor $Q_5$ is connected through conductor 90 to the collector electrode 92 of the transistor $Q_6$, the emitter electrode 94 of which is directly connected to the opposie power line 32. This section has a transformer $T_3$ similar to $T_2$ which has four windings 96, 98, 100 and 102. The point 80 on the first section B of the power amplifier is connected through resistor 104, having in shunt therewith capacitor 106 to a tap 108 on winding 96 of transformer $T_3$. Winding 98 of the transformer $T_3$ is connected across the base-emitter circuit of transistor $Q_5$. The upper terminal of winding 96 is connected to the lower terminal of winding 98 and both of these are connected to line 90. The lower terminal of winding 96 of transformer $T_3$ is connected to the pulse width control section D through conductor 110 which extends to two rectifiers 112 and 114 connected in parallel circuits in reverse polarity mode. Rectifier 112 is connected in series with an inductance coil 116. Rectifier 114 is connected in series with inductance coil or winding 118. Each of these windings 116 and 118 is separately wound on an individual core with a third control saturating winding 120 wound commonly on both cores to comprise a magnetic amplifier. The left end terminals of windings 116 and 118 are connected together and through conductor 122 to point 16 at the output of the oscillator section A. The final and fourth winding 100 of transformer $T_3$ has one terminal connected to conductor 90 and the other terminal connected through line 124 to one terminal of the primary winding 18 of the output transformer 2.

To this point of description, therefore, the oscillatory section A generates a series of pulses which are amplified by the bridge power amplifier section, the output of which is developed across the primary 18 of the output transformer 2 to produce a desired A.C. power output. This output is regulated by varying the saturation on the pulse width control magnetic amplifier consisting of windings 116, 118 and 120 to maintain the output constant by varying the pulse width in a manner to be described. The secondary winding 126 of the power output transformer 2 has one terminal connected directly to one main output terminal 4. The other end of the power output transformer secondary 126 is connected through a choke coil 128 in series with a condenser 130 and thence through primary transformer winding 132 of transformer 134 to the other main output terminal 6. A condenser 138 is connected directly across between a point intermediate the condenser 130 and the primary winding 132 to output terminal 4 for filter purposes.

Also connected across these same two points is the primary winding 140 of sampling transformer 142 for developing an error signal. The secondary winding 144 of sampling transformer 142 is center tapped at 146 and this center tap is connected to conductor 148. One outside terminal of the secondary winding 144 is connected through a first rectifier 150 to conductor 152 and the other end terminal through a second rectifier 154 to the same conductor to form a full wave rectifier. A pair of resistors 156 and 158 are connected in series across the two lines 148 and 152 to form a voltage divider and a variable tap 160 movable over resistor 158 is connected through a rectifier 162 to one of the terminals 10 of the control winding of the magnetic amplifier. A condenser 164 is connected between the variable tap 160 and line 148 for filtering and a biasing resistor 166 is connected between terminal 10 and line 148. A Zener diode 168 across which a regulating voltage is developed in this error detection circuit is connected between line 148 and terminal 8.

The output voltage of the inverter appears across the primary of sampling transformer 142 which is a part of the output filter network. The secondary winding 144 is utilized to develop a sample voltage for error detection. This sample voltage is full wave rectified by rectifiers 150 and 154 and applied to the reference bias resistor 170 and Zener diode 168. The reference diode 168 provides a D.C. potential across the magnetic amplifier control winding 120. This potential changes only slightly with small changes in the size of the output voltage. The voltage at the left end of resistor 156 changes in direct proportion to the output voltage. In describing the regulation by this circuit assume that the output voltage is low. With this condition the rectifier 162 is reverse biased and control current is a maximum value flowing through circuitry 120 as it is established by the potential across Zener rectifier 168 and that across resistance 166. With this value of control current the magnetic amplifier does not saturate for the whole half cycle in either direction and there is no zero time in the wave form between point 80 and point 172. As the output voltage increases rectifier 162 becomes forward biased and the control current decreases, narrowing the pulse width of the pulses passing through the magnetic amplifier and being generated between points 80 and 172. This tends to decrease the output and regulation is accomplished.

That portion of the circuitry remaining to be described in FIG. 1 is provided for short circuit and overload protection. It has been designated as section F. It includes the transformer 134 and that circuitry to the right thereof. Transformer 134 is provided with a secondary winding 174 the upper terminal of which is connected through a rectifier 176 to a conductive line 178. In like manner the lower terminal of the secondary 174 is connected through a rectifier 180 to the same conductive line 178. A center tap 182 of the winding 174 is connected through a resistor 184 to the conductor 178 and also through a tie line 186 to the conductor 148 of the error detecting section. A blocking condenser 188 is connected between tie line 186 and line 178. A rectifier 190 is connected between conductor 178 and terminal 10 of the error detecting section and magnetic amplifier control winding 120.

This protective circuit operates as follows. The load current passing through the primary 132 of the current transformer 134 causes a smaller current to flow in the secondary winding 174. This secondary current is full wave rectified by the two rectifiers 176 and 180 and applied to the resistance-capacity circuit consisting of resistor 184 and condenser 188. If rectifier 190 is reverse biased and the time period of resistor 184 and condenser 188 is larger than the period of the current flowing in the transformer, the drop across resistor 184 will be D.C. proportional to the R.M.S. value of the transformer current. At low values of current the potential across resistor 184 is small compared to that across resistor 166 in the error detecting section. As long as this condition exists diode 190 is reverse biased. With an increase of load current, however, the potential across resistance 184 increases until rectifier 190 is forward biased and current flows into point 10 of the saturating winding. This causes a reduction in control current through control winding 120 of the magnetic amplifier and a narrowing of the pulse width of the wave form between point 80 and point 172. This lowers the output voltage and consequently the output current. With a short circuit on the output the pulse width is reduced to a sufficiently narrow value to limit the output current to a point where the unit can handle the same. With the removal of the overload the unit automatically returns to normal operation.

The protective circuit in FIG. 1 against overloads and short circuits is that section indicated at F and its operation has been described. In smaller sized units, such as those handling up to 250 volt amperes, this type of protective circuit is fast acting enough to protect the device from short circuits. However, in larger models such a circuit will not act fast enough on dead short circuit to prevent damage. It is then necessary to add a further protective circuit which acts instantaneously to shut down the pulses across the power amplifier until the circuit of section F can take over to control until the short is removed, then automatically return the inverter to normal operation.

Figure 2:
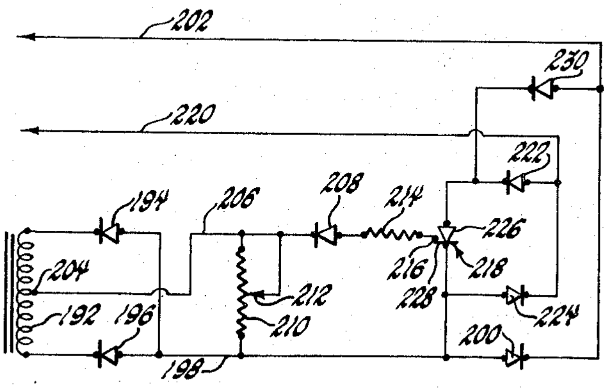
FIG. 2 is a circuit diagram of a modified form of quick acting protective circuit for use in large size static inverter units.

Such an additional circuit is shown in FIG. 2. It obtains a signal from a current transformer in series with the primary winding 18 of transformer 2 and applies a control pulse across the B and C sections of the power amplifier. The circuit per se of FIG. 2 includes a secondary winding 192 on such a current transformer. The winding 192 has its outer terminals connected through two diodes 194 and 196 to conductive line 198 to provide a full wave rectifier. Line 198 is connected through rectifier 200 with line 202 which extends back and is connected to one side of the bridge power amplifier. The center tap 204 of the winding 192 is connected through conductor 206 with the cathode of a Zener diode 208. A resistance 210 is connected across lines 206, 198 and has a variable shunt tap 212 to adjust the amount of resistance in circuit.

The anode of the Zener diode is connected to resistance 214, the opposite terminal of which is connected to the gate or control electrode 216 of a silicon controlled rectifier 218. A second interconnecting line 220 which extends back into the bridge power amplifier is connected to two rectifiers 222 and 224 in reverse poled mode. The cathode of diode 222 is connected to the anode 226 of the silicon controlled rectifier 218. The anode of rectifier 224 is connected to the cathode 228 of the silicon controlled rectifier and also to conductor 198. Lastly, a rectifier 230 is connected between line 202 and the silicon controlled rectifier anode 226, having its anode connected to line 202 and cathode connected to anode 226 of the silicon controlled rectifier.

The signal current induced in the secondary flows through the full wave rectifier circuit consisting of winding 192, rectifiers 194 and 196, and lines 206 and 198. The great majority of this signal current flows through the shunt to tap 212 and the lower end of resistance 210. The tap is adjusted to cause the potential across the lower half of resistance 210, at a predetermined value of signal current, to be sufficient to cause current to flow through the control circuit consisting of gate terminal 228 of the silicon controlled rectifier 218, resistance 214, and reference diode 208. This causes the silicon controlled rectifier 218 to exhibit a low forward impedance. It also causes the impedance between lines 202 and 220 to be reduced from a comparative open circuit to a very low value due to the bridge rectifying action of rectifiers 200, 222, 230 and 224. By connecting the lines 202 and 220 to the lower ends of windings 58 and 96, (FIG. 1), the state of the C side of the power amplifier will be instantly changed to that of the B side when the silicon controlled rectifier is turned on. The output of the bridge power amplifier is then zero and the output current decreases reducing the gate current (terminal 216) of the silicon controlled rectifier to zero. During the switching action caused by the next oscillator pulse the lines 202 and 220 will pass through a condition where the potential difference between them is zero and the anode current (terminal 226) of the silicon controlled rectifier reduces to zero for a sufficient time to allow the silicon controlled rectifier to recover and assume a high impedance condition. If the short circuit is still present and the output pulse width is of sufficient width (depending upon the output filters or power transformer inductances), the silicon controlled rectifier gate current will again flow and the above procedure repeat. After several cycles of this type of operation the protective system F (FIG. 1) has enough time to charge up and take over. Once section F has taken over load currents are of insufficient magnitude to trigger the silicon controlled rectifier and this circuit retires from action.

What is claimed is:

1. Static inverter means for converting D.C. to A.C. power comprising, a source of D.C. power, an oscillator connected thereto for producing a series of pulses when energized, a bridge power amplifier including two arms connected to the output of oscillator, magnetic amplifier control means connected between the output of the oscillator and one arm of the bridge power amplifier to control the time phase of the pulses applied thereto and thus control the output of the bridge power amplifier, an output transformer connected to the bridge power amplifier across which the A.C. power is developed, an output circuit connected to the output transformer to deliver the generated A.C. power, an error signal transformer connected across the output circuit, a reference diode connected to the error signal transformer, biasing means connected to the reference diode and error signal transformer to forward bias the diode when the voltage exceeds a given value and conductive means connecting the reference diode and magnetic amplifier control means to regulate the output of the bridge power amplifier.

2. Static inverter means comprising, a source of D.C. power, an oscillator connected to said source of D.C. power for generating a continuous series of pulses when energized, a bridge power amplifier having an input and an output circuit said input circuit being connected to the oscillator and receiving pulses therefrom for amplification, magnetic control means connected in said input circuit to control the pulses applied to one side of the bridge power amplifier and thus adjust the output and having a control winding, an error detecting system connected to the output circuit of the bridge power amplifier including a reference diode and means for biasing the same so that at normal voltage output the reference diode is reverse biased but upon a rise in voltage the reference diode becomes forward biased and conducts, means connecting the error detecting system to the magnetic amplifier control means to vary the saturation thereof upon a signal from the error detecting system to adjust the output of the bridge power amplifier.

3. Static inverter means comprising, a source of D.C. power, an oscillator connected to said source of D.C. power for generating a continuous series of pulses when energized, a bridge power amplifier having an input and an output circuit said input circuit being connected to the oscillator and receiving pulses therefrom for amplification, magnetic control means connected in said input circuit to control the pulses applied to one side of the bridge power amplifier and thus adjust the output and having a control winding, an error detecting system connected to the output circuit of the bridge power amplifier including a reference diode and means for biasing the same so that at normal voltage output the reference diode is reverse biased but upon a rise in voltage the reference diode becomes forward biased and conducts, means connecting the error detecting system to the magnetic amplifier control means to vary the saturation thereof upon a signal from the error detecting system to adjust the output of the bridge power amplifier, a current transformer connected in the bridge power amplifier output circuit, a second reference diode connected to the current transformer in the bridge power amplifier output circuit, a third reference diode connected to the current transformer and to the error detecting system, biasing means including a condenser connected to the third reference diode to normally reverse bias the same but to overcome said reverse bias upon overload or short circuit of the output circuit to apply a signal to the error detecting system and cause the magnetic amplifier control means to reduce the output.

4. Static inverter means comprising, a source of D.C. power, an oscillator connected to said source of D.C. power for generating a continuous series of pulses when energized, a bridge power amplifier having an input and an output circuit said input circuit being connected to the oscillator and receiving pulses therefrom for amplification, magnetic control means connected in said input circuit to control the pulses applied to one side of the bridge power amplifier and thus adjust the output and having a control winding, an error detecting system connected to the output circuit of the bridge power amplifier including a reference diode and means for biasing the same so that at normal voltage output the reference diode is reverse biased but upon a rise in voltage the reference diode becomes forward biased and conducts, means connecting the error detecting system to the magnetic amplifier control means to vary the saturation thereof upon a signal from the error detecting system to adjust the output of the bridge power amplifier, a current transformer connected in the bridge power amplifier output circuit, a second reference diode connected to the current transformer in the bridge power amplifier output circuit, a third reference diode connected to the current transformer and to the error detecting system, biasing means including a condenser connected to the third reference diode to normally reverse bias the same but to overcome said reverse bias upon overload or short circuit of the output circuit to apply a signal to the error detecting system and cause the magnetic amplifier control means to reduce the output, a second current transformer connected in the bridge amplifier output circuit, a silicon controlled rectifier having a control electrode, anode and cathode, said anode and cathode being connected across the input to the bridge power amplifier and the control electrode to the second current transformer, biasing means connected to the control electrode of the silicon controlled rectifier to maintain the latter non-conductive during normal operation of the static inverter but to cause the same to conduct upon a short circuit of the output to reduce the output of the inverter instantly to substantially zero and maintain it there until the first error detecting system can take over.

5. Static inverter means comprising a source of D.C. power, an oscillator connected thereto to generate a continuous sequence of pulses when energized, a transistorized bridge amplifier having a pair of arms each including two transistors and an input and an output circuit, a first and a second multi-winding transformer connected in the input circuit and to the oscillator and having a portion of its windings connected to the transistors in each arm, a magnetic amplifier control means connected in series with the windings of one transformer to control the phase of the pulses applied to one arm and thus the total output of the amplifier, said magnetic amplifier control means having a control coil, an output transformer connected across the output circuit of the bridge amplifier and in series with one winding on each of said first and second multi-winding transformers to provide feed-back currents to said transformers and reduce the transistor drive requirements.

6. Static inverter means for converting D.C. to A.C. power comprising, a source of D.C. power, an oscillator connected thereto for producing a series of pulses when energized, a bridge power amplifier including two arms connected to the output of the oscillator, magnetic amplifier control means connected between the output of the oscillator and one arm of the bridge power amplifier to control the time phase of the pulses applied thereto and thus control the output of the bridge power amplifier, an output transformer connected to the bridge power amplifier across which the A.C. power is developed, an output circuit connected to the output transformer to deliver the generated A.C. power, an error signal transformer connected across the output circuit across which the output voltage is applied, said transformer having a secondary winding, a fullwave rectifier connected across the secondary winding to develop a D.C. voltage proportional to the R.M.S. of the alternating current voltage, resistance means connected across the full wave rectifier forming a voltage divider, an adjustable tap thereon, second rectifier means connected between the adjustable tap and magnetic amplifier control means, second voltage divider means connected across the full wave rectifier, an intermediate point of which is connected to the second rectifier means to bias the same and a reference diode connected in shunt to a portion of the second voltage divider to regulate the forward current to the magnetic amplifier control means and thus the output.

7. Static inverter means for converting D.C. to A.C. power comprising, a source of D.C. power, an oscillator connected thereto for providing a series of pulses when energized, a bridge power amplifier including two arms connected to the output of the oscillator, magnetic amplifier control means connected between the output of the oscillator and one arm of the bridge power amplifier to control the time phase of the pulses applied thereto and thus control the output of the bridge power amplifier, an output transformer connected to the bridge power amplifier across which the A.C. power is developed, an output circuit connected to the output transformer to deliver the generated A.C. power, an error signal transformer connected across the output circuit across which the output voltage is applied, said transformer having a secondary winding, a full wave rectifier connected across the secondary winding to develop a D.C. voltage proportional to the R.M.S. of the alternating current voltage, resistance means connected across the full wave rectifier forming a voltage divider, an adjustable tap thereon, second rectifier means connected between the adjustable tap and magnetic amplifier control means, second voltage divider means connected across the full wave rectifier, an intermediate point of which is connected to the second rectifier means to bias the same and a reference diode connected in shunt to a portion of the second voltage divider to regulate the forward current to the magnetic amplifier control means and thus the output, a plurality of current transformers connected in the output circuit, full wave rectifier means connected to each current transformer to develop D.C. signals proportional to the output current, a second reference diode connected to the output of one full wave rectifier and to the magnetic amplifier control means, biasing means including a condenser connected to said one full wave rectifier and the second reference diode to reverse bias the same under normal conditions but forward bias it on short circuit or overload, a pair of conductors connected across the bridge amplifier input, a silicon controlled rectifier connected across the pair of conductors to short circuit the same if conductive, said silicon controlled rectifier having a gate electrode and biasing means connected to the output of the other full wave rectifier of the current transformer and to the gate electrode to control conductive periods of the silicon controlled rectifier to cut off the static inverter quickly on energizing.

References Cited by the Examiner

UNITED STATES PATENTS

| | | | |
|---|---|---|---|
| 3,010,062 | 11/1961 | Van Emden | 321—18 |
| 3,189,813 | 6/1965 | Frierdich | 321—45 |
| 3,205,424 | 9/1965 | Bates | 321—18 |
| 3,247,447 | 4/1966 | Flairty | 321—14 |

JOHN F. COUCH, *Primary Examiner.*

W. M. SHOOP, *Assistant Examiner.*